(12) United States Patent
Oehring et al.

(10) Patent No.: US 10,934,824 B2
(45) Date of Patent: *Mar. 2, 2021

(54) SYSTEM FOR REDUCING VIBRATIONS IN A PRESSURE PUMPING FLEET

(71) Applicant: U.S. Well Services, LLC, Houston, TX (US)

(72) Inventors: Jared Oehring, Houston, TX (US); Robert Kurtz, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,756

(22) Filed: Oct. 12, 2018

(65) Prior Publication Data

US 2019/0040727 A1 Feb. 7, 2019

Related U.S. Application Data

(63) Continuation of application No. 15/145,414, filed on May 3, 2016, now Pat. No. 10,119,381, which is a
(Continued)

(51) Int. Cl.
*E21B 43/26* (2006.01)
*F01D 15/10* (2006.01)
(Continued)

(52) U.S. Cl.
CPC ............ *E21B 43/26* (2013.01); *F01D 15/08* (2013.01); *F01D 15/10* (2013.01); *F02C 3/22* (2013.01);
(Continued)

(58) Field of Classification Search
CPC .......... E21B 43/26; E21B 43/25; E21B 47/00; F01D 15/08; F01D 15/10; F02C 3/22;
(Continued)

(56) References Cited

U.S. PATENT DOCUMENTS

| | | | |
|---|---|---|---|
| 1,656,861 A | | 1/1928 | Leonard |
| 1,671,436 A | * | 5/1928 | Melott ...................... F16D 3/68 |
| | | | 464/76 |

(Continued)

FOREIGN PATENT DOCUMENTS

| | | |
|---|---|---|
| AU | 2007340913 | 7/2008 |
| AU | 2011203353 | 7/2011 |

(Continued)

OTHER PUBLICATIONS

International Search Report and Written Opinion dated Jul. 9, 2019 in corresponding PCT Application No. PCT/US2019/027584.
(Continued)

*Primary Examiner* — Yong-Suk (Philip) Ro
(74) *Attorney, Agent, or Firm* — Hogan Lovells US LLP

(57) ABSTRACT

The present technology provides an electrically powered hydraulic fracturing system having pumps for pressurizing fracturing fluid, piping for carrying fracturing fluid, and vibration reducing equipment for use with the piping. The vibration reducing equipment includes helical coils that support the piping. The coils are made of a wire rope made of strands of steel cable twisted together. Grooved fittings are provided on some piping connections, and which allow pivoting between adjacent fluid conveyance members. Swivel joints are strategically located in the piping which allow rotational flexing between adjacent sections of the piping; thereby attenuating vibration in the piping but without stressing the piping.

15 Claims, 9 Drawing Sheets

Related U.S. Application Data continuation-in-part of application No. 13/679,689, filed on Nov. 16, 2012, now Pat. No. 9,410,410.

(60) Provisional application No. 62/156,306, filed on May 3, 2015.

(51) Int. Cl.

| | | |
|---|---|---|
| *F16F 15/067* | (2006.01) | |
| *F16L 55/04* | (2006.01) | |
| *F01D 15/08* | (2006.01) | |
| *F04B 17/03* | (2006.01) | |
| *F04B 19/22* | (2006.01) | |
| *F04B 49/20* | (2006.01) | |
| *F02C 3/22* | (2006.01) | |
| *H02P 23/00* | (2016.01) | |
| *F04B 23/04* | (2006.01) | |
| *F04B 47/00* | (2006.01) | |
| *F04B 23/00* | (2006.01) | |
| *F04B 53/00* | (2006.01) | |
| *F16F 3/04* | (2006.01) | |

(52) U.S. Cl.
CPC ............ *F04B 17/03* (2013.01); *F04B 19/22* (2013.01); *F04B 23/00* (2013.01); *F04B 23/04* (2013.01); *F04B 47/00* (2013.01); *F04B 49/20* (2013.01); *F04B 53/003* (2013.01); *F16F 15/067* (2013.01); *F16L 55/041* (2013.01); *H02P 23/00* (2013.01); *F05D 2220/32* (2013.01); *F16F 3/04* (2013.01)

(58) Field of Classification Search
CPC .......... F04B 17/03; F04B 19/22; F04B 23/04; F04B 47/00; F04B 49/20; F16F 15/067; F16F 3/04; F16L 55/041; H02P 23/00; F05D 2220/32

See application file for complete search history.

(56) References Cited

U.S. PATENT DOCUMENTS

| | | |
|---|---|---|
| 2,004,077 A | 6/1935 | McCartney |
| 2,183,364 A | 12/1939 | Bailey |
| 2,220,622 A | 11/1940 | Aitken |
| 2,248,051 A | 7/1941 | Armstrong |
| 2,389,328 A | 11/1945 | Stilwell |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 3,055,682 A | 9/1962 | Bacher |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,601,198 A | 8/1971 | Ahearn |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,881,551 A | 5/1975 | Terry |
| 3,978,877 A | 9/1976 | Cox |
| 4,037,431 A | 7/1977 | Sugimoto |
| 4,066,869 A | 1/1978 | Apaloo |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,421,975 A | 12/1983 | Stein |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,793,386 A * | 12/1988 | Sloan ................. E03F 7/10 137/351 |
| 4,845,981 A | 7/1989 | Pearson |
| 4,877,956 A | 10/1989 | Priest |
| 4,922,463 A | 5/1990 | Del Zotto et al. |
| 5,004,400 A | 4/1991 | Handke |
| 5,006,044 A | 4/1991 | Walker, Sr. |
| 5,025,861 A | 6/1991 | Huber |
| 5,050,673 A | 9/1991 | Baldridge |
| 5,130,628 A | 7/1992 | Owen |
| 5,131,472 A | 7/1992 | Dees et al. |
| 5,134,328 A | 7/1992 | Johnatakis |
| 5,172,009 A | 12/1992 | Mohan |
| 5,189,388 A | 2/1993 | Mosley |
| 5,230,366 A | 7/1993 | Marandi |
| 5,334,898 A | 8/1994 | Skybyk |
| 5,366,324 A | 11/1994 | Arlt |
| 5,422,550 A | 6/1995 | McClanahan |
| 5,433,243 A | 7/1995 | Griswold |
| 5,517,593 A | 5/1996 | Nenniger |
| 5,517,822 A | 5/1996 | Haws et al. |
| 5,548,093 A | 8/1996 | Sato |
| 5,590,976 A | 1/1997 | Kilheffer et al. |
| 5,655,361 A | 8/1997 | Kishi |
| 5,712,802 A | 1/1998 | Kumar |
| 5,736,838 A | 4/1998 | Dove et al. |
| 5,755,096 A | 5/1998 | Holleyman |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 6,007,227 A | 12/1999 | Carlson |
| 6,059,539 A | 5/2000 | Nyilas |
| 6,116,040 A | 9/2000 | Stark |
| 6,138,764 A | 10/2000 | Scarsdale et al. |
| 6,142,878 A | 11/2000 | Barin |
| 6,164,910 A | 12/2000 | Mayleben |
| 6,167,965 B1 | 1/2001 | Bearden |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,321,860 B1 | 11/2001 | Reddoch |
| 6,477,852 B2 | 11/2002 | Dodo |
| 6,484,490 B1 | 11/2002 | Olsen |
| 6,491,098 B1 | 12/2002 | Dallas |
| 6,529,135 B1 | 3/2003 | Bowers et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida |
| 6,786,051 B2 | 9/2004 | Kristich |
| 6,802,690 B2 | 10/2004 | Han |
| 6,808,303 B2 | 10/2004 | Fisher |
| 6,857,486 B2 | 2/2005 | Chitwood |
| 6,931,310 B2 | 8/2005 | Shimizu et al. |
| 6,936,947 B1 | 8/2005 | Leijon |
| 6,985,750 B1 | 1/2006 | Vicknair |
| 7,006,792 B2 | 2/2006 | Wilson |
| 7,011,152 B2 | 3/2006 | Soelvik |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,308,933 B1 | 12/2007 | Mayfield |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |

(56) References Cited

U.S. PATENT DOCUMENTS

| | | |
|---|---|---|
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,660,648 B2 | 2/2010 | Dykstra |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,835,140 B2 | 11/2010 | Mori |
| 7,845,413 B2 | 12/2010 | Shampine et al. |
| 7,901,314 B2 | 3/2011 | Salvaire |
| 7,926,562 B2 | 4/2011 | Poitzsch |
| 7,949,483 B2 | 5/2011 | Discenzo |
| 7,894,757 B2 | 7/2011 | Keast |
| 7,971,650 B2 | 7/2011 | Yuratich |
| 7,977,824 B2 | 7/2011 | Halen et al. |
| 3,037,936 A1 | 10/2011 | Neuroth |
| 8,054,084 B2 | 11/2011 | Schulz et al. |
| 3,069,710 A1 | 12/2011 | Dodd |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,174,853 B2 | 5/2012 | Kane |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,379,424 B2 | 2/2013 | Grbovic |
| 3,469,097 A1 | 6/2013 | Gray |
| 8,474,521 B2 | 7/2013 | Kajaria |
| 3,506,267 A1 | 8/2013 | Gambier |
| 8,503,180 B2 | 8/2013 | Nojima |
| 8,506,267 B2 | 8/2013 | Gambier et al. |
| 8,534,235 B2 | 9/2013 | Chandler |
| 8,534,366 B2 | 9/2013 | Fielder |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,622,128 B2 | 1/2014 | Hegeman |
| 8,628,627 B2 | 1/2014 | Sales |
| 8,646,521 B2 | 2/2014 | Bowen |
| 8,692,408 B2 | 4/2014 | Zhang et al. |
| 8,727,068 B2 | 5/2014 | Bruin |
| 8,727,737 B2 | 5/2014 | Seiner |
| 8,727,783 B2 | 5/2014 | Chen |
| 8,760,657 B2 | 6/2014 | Pope |
| 8,763,387 B2 | 7/2014 | Schmidt |
| 8,774,972 B2 | 7/2014 | Rusnak |
| 8,789,601 B2 | 7/2014 | Broussard |
| 8,789,609 B2 | 7/2014 | Smith |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,874,383 B2 | 10/2014 | Gambier |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,067,182 B2 | 6/2015 | Nichols |
| 9,080,412 B2 | 7/2015 | Wetzel |
| 9,103,193 B2 | 8/2015 | Coll |
| 9,119,326 B2 | 8/2015 | McDonnell |
| 9,121,257 B2 | 9/2015 | Coli |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,260,253 B2 | 2/2016 | Naizer |
| 9,322,239 B2 | 4/2016 | Angeles Boza et al. |
| 9,324,049 B2 | 4/2016 | Thomeer |
| 9,340,353 B2 | 5/2016 | Oren |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring et al. |
| 9,822,631 B2 | 11/2017 | Ravi |
| 9,840,897 B2 | 12/2017 | Larson |
| 9,840,901 B2 | 12/2017 | Oehring et al. |
| 9,841,026 B2 | 12/2017 | Stinessen |
| 9,863,228 B2 | 1/2018 | Shampine et al. |
| RE46,725 E | 2/2018 | Case |
| 9,893,500 B2 | 2/2018 | Oehring |
| 9,909,398 B2 | 3/2018 | Pham |
| 9,915,128 B2 | 3/2018 | Hunter |
| 9,932,799 B2 | 4/2018 | Symchuk |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 | 6/2018 | Vicknair |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,167,863 B1 | 1/2019 | Cook |
| 10,184,465 B2 | 1/2019 | Enis et al. |
| 10,196,878 B2 | 2/2019 | Hunter |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,415,332 B2 | 9/2019 | Morris |
| 10,436,026 B2 | 10/2019 | Ounadjela |
| 10,443,660 B2 | 10/2019 | Harris |
| 10,627,003 B2 | 4/2020 | Dale et al. |
| 10,669,471 B2 | 6/2020 | Schmidt et al. |
| 10,669,804 B2 | 6/2020 | Kotrla |
| 10,695,950 B2 | 6/2020 | Igo et al. |
| 10,711,576 B2 | 7/2020 | Bishop |
| 2002/0169523 A1 | 11/2002 | Ross et al. |
| 2003/0056514 A1 | 3/2003 | Lohn |
| 2003/0079875 A1 | 5/2003 | Weng |
| 2003/0138327 A1 | 7/2003 | Jones et al. |

(56) References Cited

U.S. PATENT DOCUMENTS

| | | |
|---|---|---|
| 2004/0040746 A1 | 3/2004 | Niedermayr |
| 2004/0102109 A1 | 5/2004 | Crafty et al. |
| 2004/0167738 A1 | 8/2004 | Miller |
| 2005/0061548 A1 | 3/2005 | Hooper |
| 2005/0116541 A1 | 6/2005 | Seiver |
| 2005/0274508 A1 | 12/2005 | Folk |
| 2006/0052903 A1 | 3/2006 | Bassett |
| 2006/0065319 A1 | 3/2006 | Csitari |
| 2006/0260331 A1 | 11/2006 | Andreychuk |
| 2007/0125544 A1 | 6/2007 | Robinson |
| 2007/0131410 A1 | 6/2007 | Hill |
| 2007/0151731 A1 | 7/2007 | Butler |
| 2007/0187163 A1 | 8/2007 | Cone |
| 2007/0201305 A1 | 8/2007 | Heilman et al. |
| 2007/0204991 A1 | 9/2007 | Loree |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0066911 A1 | 3/2008 | Luharuka |
| 2008/0095644 A1 | 4/2008 | Mantel et al. |
| 2008/0112802 A1 | 5/2008 | Orlando |
| 2008/0137266 A1 | 6/2008 | Jensen |
| 2008/0187444 A1 | 8/2008 | Molotkov |
| 2008/0208478 A1 | 8/2008 | Ella et al. |
| 2008/0217024 A1 | 9/2008 | Moore |
| 2008/0236818 A1 | 10/2008 | Dykstra |
| 2008/0264625 A1 | 10/2008 | Ochoa |
| 2008/0264640 A1 | 10/2008 | Eslinger |
| 2008/0264649 A1 | 10/2008 | Crawford |
| 2008/0303469 A1 | 12/2008 | Nojima |
| 2009/0045782 A1 | 2/2009 | Datta |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0101410 A1 | 4/2009 | Egilsson |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0194273 A1 | 8/2009 | Surjaatmadja |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1* | 1/2010 | Chandler ............... F24H 1/06 126/116 R |
| 2010/0019574 A1 | 1/2010 | Baldassarre et al. |
| 2010/0038077 A1 | 2/2010 | Heilman |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0300683 A1 | 12/2010 | Looper |
| 2010/0303655 A1 | 12/2010 | Scekic |
| 2010/0310384 A1 | 12/2010 | Stephenson |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier |
| 2011/0061855 A1 | 3/2011 | Case et al. |
| 2011/0079302 A1 | 4/2011 | Hawes |
| 2011/0085924 A1 | 4/2011 | Shampine |
| 2011/0166046 A1 | 7/2011 | Weaver |
| 2011/0194256 A1 | 8/2011 | De Rijck |
| 2011/0247831 A1 | 10/2011 | Smith |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0067582 A1 | 3/2012 | Fincher |
| 2012/0085541 A1 | 4/2012 | Love |
| 2012/0127635 A1 | 5/2012 | Grindeland |
| 2012/0152549 A1 | 6/2012 | Koroteev |
| 2012/0152716 A1 | 6/2012 | Kikukawa et al. |
| 2012/0205112 A1 | 8/2012 | Pettigrew |
| 2012/0205119 A1 | 8/2012 | Wentworth |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli |
| 2013/0009469 A1 | 1/2013 | Gillett |
| 2013/0025706 A1 | 1/2013 | DeGaray et al. |
| 2013/0064528 A1 | 3/2013 | Bigex |
| 2013/0175038 A1 | 7/2013 | Conrad |
| 2013/0175039 A1* | 7/2013 | Guidry ............... E21B 33/068 166/308.1 |
| 2013/0180722 A1 | 7/2013 | Olarte Caro |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0242688 A1 | 9/2013 | Kageler |
| 2013/0255271 A1 | 10/2013 | Yu et al. |
| 2013/0278183 A1 | 10/2013 | Liang |
| 2013/0284278 A1 | 10/2013 | Winborn |
| 2013/0299167 A1 | 11/2013 | Fordyce |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0041730 A1 | 2/2014 | Naizer |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0127036 A1 | 5/2014 | Buckley |
| 2014/0138079 A1 | 5/2014 | Broussard |
| 2014/0147310 A1 | 5/2014 | Hunt |
| 2014/0174717 A1 | 6/2014 | Broussard et al. |
| 2014/0205475 A1 | 7/2014 | Dale |
| 2014/0219824 A1 | 8/2014 | Burnette |
| 2014/0238683 A1 | 8/2014 | Korach |
| 2014/0246211 A1* | 9/2014 | Guidry ............... E21B 43/26 166/379 |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0332199 A1 | 11/2014 | Gilstad |
| 2014/0379300 A1 | 12/2014 | Devine et al. |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0078924 A1 | 3/2015 | Zhang |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |

(56) References Cited

U.S. PATENT DOCUMENTS

| | | |
|---|---|---|
| 2015/0330172 A1 | 11/2015 | Allmaras |
| 2015/0354322 A1 | 12/2015 | Vicknair |
| 2016/0032703 A1 | 2/2016 | Broussard et al. |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0096885 A1 | 4/2017 | Oehring |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0218727 A1 | 8/2017 | Oehring |
| 2017/0218843 A1 | 8/2017 | Oehring |
| 2017/0222409 A1 | 8/2017 | Oehring |
| 2017/0226838 A1 | 8/2017 | Ciezobka |
| 2017/0226839 A1 | 8/2017 | Broussard |
| 2017/0226842 A1 | 8/2017 | Omont et al. |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye et al. |
| 2017/0328179 A1 | 11/2017 | Dykstra |
| 2017/0369258 A1 | 12/2017 | DeGaray |
| 2018/0028992 A1 | 2/2018 | Stegemoeller |
| 2018/0038216 A1 | 2/2018 | Zhang |
| 2018/0045331 A1 | 2/2018 | Lopez |
| 2018/0156210 A1 | 6/2018 | Oehring |
| 2018/0183219 A1 | 6/2018 | Oehring |
| 2018/0216455 A1 | 8/2018 | Andreychuk |
| 2018/0238147 A1 | 8/2018 | Shahri |
| 2018/0245428 A1 | 8/2018 | Richards |
| 2018/0258746 A1 | 9/2018 | Broussard |
| 2018/0266412 A1 | 9/2018 | Stokkevag |
| 2018/0274446 A1 | 9/2018 | Oehring |
| 2018/0291713 A1 | 10/2018 | Jeanson |
| 2018/0320483 A1 | 11/2018 | Zhang |
| 2018/0343125 A1 | 11/2018 | Clish |
| 2018/0363437 A1 | 12/2018 | Coli |
| 2019/0003329 A1 | 1/2019 | Morris |
| 2019/0010793 A1 | 1/2019 | Hinderliter |
| 2019/0055827 A1 | 2/2019 | Coli |
| 2019/0063309 A1 | 2/2019 | Davis |
| 2019/0100989 A1 | 4/2019 | Stewart |
| 2019/0112910 A1 | 4/2019 | Oehring |
| 2019/0119096 A1 | 4/2019 | Haile |
| 2019/0120024 A1 | 4/2019 | Oehring |
| 2019/0128080 A1 | 5/2019 | Ross |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0292866 A1 | 9/2019 | Ross |
| 2019/0292891 A1 | 9/2019 | Kajaria |
| 2019/0316447 A1 | 10/2019 | Oehring |
| 2020/0047141 A1 | 2/2020 | Oehring et al. |
| 2020/0088152 A1 | 3/2020 | Allion et al. |
| 2020/0232454 A1 | 7/2020 | Chretien |

FOREIGN PATENT DOCUMENTS

| | | |
|---|---|---|
| CA | 2158637 | 9/1994 |
| CA | 2406801 | 11/2001 |
| CA | 2653069 | 12/2007 |
| CA | 2707269 | 12/2010 |
| CA | 2482943 | 5/2011 |
| CA | 3050131 | 11/2011 |
| CA | 2773843 | 10/2012 |
| CA | 2845347 | 10/2012 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 101639059 | 2/2010 |
| CN | 201687513 | 12/2010 |
| CN | 101977016 | 2/2011 |
| CN | 201730812 | 2/2011 |
| CN | 201819992 | 5/2011 |
| CN | 201925157 | 8/2011 |
| CN | 202023547 | 11/2011 |
| CN | 202157824 | 3/2012 |
| CN | 102602322 | 7/2012 |
| CN | 202406331 | 8/2012 |
| CN | 202463670 | 10/2012 |
| CN | 202500735 | 10/2012 |
| CN | 202545207 | 11/2012 |
| CN | 103095209 | 5/2013 |
| CN | 102758604 | 12/2014 |
| CN | 205986303 U | 2/2017 |
| CN | 108049999 A | 5/2018 |
| EP | 3453827 | 3/2019 |

(56) References Cited

FOREIGN PATENT DOCUMENTS

| EP | 3456915 | 3/2019 |
|---|---|---|
| JP | 2004264589 | 9/2004 |
| JP | 3626363 | 3/2005 |
| JP | 2008263774 | 10/2008 |
| JP | 2012-117371 | 6/2012 |
| KR | 20100028462 | 3/2010 |
| RU | 48205 | 9/2005 |
| RU | 98193 | 10/2010 |
| RU | 2421605 | 6/2011 |
| WO | 93/20328 | 10/1993 |
| WO | 98/53182 | 11/1998 |
| WO | 2008/136883 | 11/2008 |
| WO | 2009/023042 | 2/2009 |
| WO | 2011/127305 | 10/2011 |
| WO | 2012/122636 | 9/2012 |
| WO | 2012/137068 | 10/2012 |
| WO | 2016/144939 | 9/2016 |
| WO | 2016/160458 | 10/2016 |

OTHER PUBLICATIONS

Office Action dated Jun. 11, 2019 in corresponding U.S. Appl. No. 16/210,749.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Danadian Office Action dated Oct. 1, 2019 in related Canadian Patent Application No. 2,936,997.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).

Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
UK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.

(56) References Cited

OTHER PUBLICATIONS

Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Non-Final Office Action dated Feb. 12, 2019 in related U.S. Appl. No. 16/170,695.
International Search Report and Written Opinion dated Feb. 15, 2019 in related PCT Application No. PCT/US18/63977.
Non-Final Office Action dated Feb. 25, 2019 in related U.S. Appl. No. 16/210,749.
International Search Report and Written Opinion dated Mar. 5, 2019 in related PCT Application No. PCT/US18/63970.
Non-Final Office Action dated Mar. 6, 2019 in related U.S. Appl. No. 15/183,387.
Office Action dated Mar. 1, 2019 in related Canadian Patent Application No. 2,943,275.
Office Action dated Jan. 30, 2019 in related Canadian Patent Application No. 2,936,997.
Non-Final Office Action dated Mar. 31, 2020 in U.S. Appl. No. 15/356,436.
Final Office Action dated Mar. 3, 2020 in U.S. Appl. No. 16/152,695.
International Search Report and Written Opinion dated Jun. 2, 2020 in corresponding PCT Application No. PCT/ US20/23809.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Office Action dated Jun. 29, 2020 in related U.S. Appl. No. 16/404,283.
Office Action dated Jun. 29, 2020 in related U.S. Appl. No. 16/728,359.
Office Action dated Jun. 22, 2020 in related U.S. Appl. No. 16/377,861.
Canadian Office Action dated Aug. 18, 2020 in related CA Patent Application No. 2,933,444.
Canadian Office Action dated Aug. 17, 2020 in related CA Patent Application No. 2,944,968.
Berets, "Berets Oil Equipment," accessed Sep. 4, 2020, 158 pages.
Andrew Howard Nunn, "The feasibility of natural gas as a fuel source for modern land-based drilling," Dec. 2011, 94 pages.
R. Saidur, "Applications of variable speed drive (VSD) in electrical motors energy savings," 2012, vol. 16, pp. 543-550.
Discenzo, "Next Generation Pump Systems Enable New Opportunities for Asset Management and Economic Optimization," accessed Sep. 4, 2020, 8 pages.
Nikolich, "Compressors, pumps, refrigeration equipment: improvement and specialization of piston pumps for oil and gas well-drilling and production operations," 1996, Chemical and Petroleum Engineering, vol. 32, pp. 157-162.
Finger, "Sandia National Handbook Laboratories Report: Slimhole handbook: procedures and recommendations for slimhole drilling and testing in geothermal exploration," Oct. 1999, 164 pages.
Steve Besore, MTU Detroit Diesel Inc., "How to select generator sets for today's oil and gas drill rigs: careful comparison and selection can improve performance and reduce costs," May 5, 2010, 4 pages, https://www.mtu-online.com/fileadmin/fm-dam/mtu-usa/mtuinnorthamerica/white-papers/WhitePaper_EDP.pdf.
Pemberton, "Strategies for Optimizing pump efficiency and LCC performance: process pumps are the largest consumers of energy in a typical pulp and paper mill—boosting their efficiency is a new avenue to reduced plant operating costs," Jun. 2003, Paper Age, pp. 28-32.
Robert B. Thompson, "Optimizing the production system using real-time measurements: a piece of the digital oilfield puzzle," Nov. 11-14, 2007, Spe Annual Technical Conference and Exhibition, Anaheim, CA, pp. 1-10.
Guffey, "Field testing of variable-speed beam-pump computer control," May 1991, SPE Production Engineering, pp. 155-160.
Irvine, "The use of variable frequency drives as a final control in the petroleum industry," 2000, IEEE, pp. 2749-2758.
R. Ikeda et al., "Hydraulic fracturing technique: pore pressure effect and stress heterogeneity," 1989, Int. J. Rock Mech. Min. Sci. & Geomech, vol. 26, No. 6, pp. 471-475.
Coli Patent Application, "Mobile, modular, electrically powered system for use in fracturing underground formations," filed Apr. 7, 2011, 28 pages.
Gardner Denver—Well Servicing Pump Model GD-2500Q, GD-25000-HD, Quintuplex Pumps, GWS Fluid End Parts List, Jul. 2011, 39 pages.
Gardner Denver C-2500 Quintuplex Well Service Pump, 2013, 2 pages.
Toshiba 2011 Industrial Catalog, Drives, PAC, PLCs, 2011, 272 pages.
Gardner Denver GD-2500 Quintuplex Well Service Pump, 2003, 2 pages.
Gardner Denver GD-25000 Quintuplex Well Service Pump Operating and Service Manual, Aug. 2005, 46 pages.
Gardner Denver GD-25000 Quintuplex Well Service Pump Power End Parts List, Apr. 2007, 15 pages.
Toshiba H9 ASD Installation and Operation Manual, Mar. 2011, 287 pages.
Offshore Technology Conference, Houston, TX, Apr. 30-May 3, 2012, Honghua Group Brochure and Pictures, 6 pages.
Charlotte Owen, "Chinese company launches new tracking rigs," May 2, 2012, Oil & Gas Technology Magazine, 2 pages.
ABB Group, MV Drive benefits for shale gas applications, Powerpoint, Apr. 2012, 16 pages.
U.S. Well Services, Game-changing hydraulic fracturing technology, reduces emissions by 99%: U.S. Well Services's patented clean fleet technology proven to cut emission, save fuel and allow for quieter operations on site, Oct. 1, 2014, 3 pages.
Asme, Hydraulic Fracturing's Greener Tint, Jan. 11, 2018, 2 pages.
Fluid Power, Clean Fleet Reduces Emissions by 99% at Hydraulic Fracturing Sites, Jan. 11, 2005, 3 pages.
Louisiana State University, Petroleum alumnus and team develop mobile fracturing unit that alleviates environmental Impact, LSU School of EE & CS, Nov. 2012, 2 pages.
Linda Kane, Energy pipeline: US Well Services brings clean fleet to Weld County, Nov. 4, 2015, Greeley Tribute, 1 pages.
Business Wire, Hunghua Group showcases shale gas, offshore and land drilling solutions at the 2013 Offshore Technology Conference, May 6, 2013, 2 pages.
Joanne Liou, Hunghua Group introduces 6,000-hp integrated shale gas system, Drilling Matters, May 21, 2012, 2 pages.
Tess Record—Trademark for Clean Fleet registered Sep. 5, 2013, accessed Jan. 14, 2020, 2 pages.
U.S. Well Services, About U.S. Well Services, accessed Jan. 14, 2020, 14 pages.
Unknown, "Improving the Drilling Cycle," Oilfield Technology, Dec. 2009, vol. 2, Issue 9, 5 pages.
Unknown, "Andon (manufacturing)," last edited Sep. 8, 2019, https://en.wikipedia.org/w/index.php?title=Andon_38 (manufacturing) &oldid=914575778, 2 pages.

(56) References Cited

OTHER PUBLICATIONS

S.K. Subramaniam, "Production monitoring system for monitoring the industrial shop floor performance," 2009, International Journal of Systems Applications, Engineering & Development, vol. 3, Issue 1, pp. 28-35.
Unknown, Evolution Well Services advances fracturing operations with an electrically powered system,Calgary PR Newswire, Jun. 4, 2012, 2 pages.
Honghua Group, Honghua Shale Gas Solutions Power Point Slides, Feb. 2012, 41 pages.
Mactel, Frac Test with VFDs Final Report Hydraulic Fracturing Pilot Test Results and Preliminary Full Scale Design United Nuclear Church Rock Facility, Dec. 23, 2003, 73 pages.
Jon Gates, ASME Hydraulic Fracturing Conference, Mar. 24, 2015, http://www.otrglobal.com/newsroom/cnotes/128720, 6 pages.
Gardner Denver Well Servicing Pump Model C2500Q Quintuplex Operating and Service Manual, Apr. 2011, 46 pages.
Coli, Mobile, modular, electrically powered system for use in fracturing underground formations using liquid petroleum gas, Oct. 5, 2012, U.S. Appl. No. 61/710,393, 59 pages.
Toshiba, G9 Brochure—G9 Series Adjustable Speed Drives, Jun. 2007, 6 pages.
Luis Gamboa, "Variable Frequency Drives in Oil and Gas Pumping Systems," Pumps & Systems, Dec. 17, 2011,48 https://www.pumpsandsystems.com/variable-frequency-drives-oil-and-gas-pumping-systems, 5 pages.
Unknown, "U.S. Well Services for Antero Fracking," Oct. 3, 2014, HHP Insight, http://hhpinsight.com/epoperations/2014/10/u-s-well-services-for-antero-fracking/, 3 pages.
Stuart H. Loewenthal, Design of Power-Transmitting Shafts, NASA Reference Publication 1123, Jul. 1984, 30 pages.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, pp. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-bumer) 06 Sep. 6, 2018 (Sep. 6, 2018), entire document, especially para [Burners for refinery Heaters].
Water and Glycol Heating Systems (https://www.heat-inc.com/wg-series-water-glycol-systems/) Jun. 18, 2018 (Jun. 18, 2018), entire document, especially WG Series Water Glycol Systems.
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.

* cited by examiner

SYSTEM FOR REDUCING VIBRATIONS IN A PRESSURE PUMPING FLEET

CROSS REFERENCE TO RELATED APPLICATIONS

This application is a continuation of, and claims priority to and the benefit of, co-pending U.S. patent application Ser. No. 15/145,414, filed May 3, 2016, which is a continuation of, and claims priority to and the benefit of, U.S. Provisional Application Ser. No. 62/156,306, filed May 3, 2015 and is a continuation-in-part of, and claims priority to and the benefit of co-pending U.S. patent application Ser. No. 13/679,689, filed Nov. 16, 2012, the full disclosures of which are hereby incorporated by reference herein for all purposes.

BACKGROUND OF THE INVENTION

1. Field of Invention

The present disclosure relates to hydraulic fracturing of subterranean formations. In particular, the present disclosure relates to methods and devices for reducing vibration during hydraulic fracturing of a subterranean formation.

2. Description of Prior Art

Hydraulic fracturing is a technique used to stimulate production from some hydrocarbon producing wells. The technique usually involves injecting fluid into a wellbore at a pressure sufficient to generate fissures in the formation surrounding the wellbore. Typically the pressurized fluid is injected into a portion of the wellbore that is pressure isolated from the remaining length of the wellbore so that fracturing is limited to a designated portion of the formation. The fracturing fluid slurry, whose primary component is usually water, includes proppant (such as sand or ceramic) that migrate into the fractures with the fracturing fluid slurry and remain to prop open the fractures after pressure is no longer applied to the wellbore. Sometimes, nitrogen, carbon dioxide, foam, diesel, or other fluids are used as the primary component instead of water. A typical hydraulic fracturing fleet may include a data van unit, blender unit, hydration unit, chemical additive unit, hydraulic fracturing pump unit, sand equipment, wireline, and other equipment.

Traditionally, the fracturing fluid slurry has been pressurized on surface by high pressure pumps powered by diesel engines. To produce the pressures required for hydraulic fracturing, the pumps and associated engines have substantial volume and mass. Heavy duty trailers, skids, or trucks are required for transporting the large and heavy pumps and engines to sites where wellbores are being fractured. Each hydraulic fracturing pump usually includes power and fluid ends, seats, valves, springs, and keepers internally. These parts allow the pump to draw in low pressure fluid (approximately 100 psi) and discharge the same fluid at high pressures (up to 15,000 psi or more). The diesel engines and transmission which power hydraulic fracturing units typically generate large amounts of vibrations of both high and low frequencies. These vibrations are generated by the diesel engine, the transmission, the hydraulic fracturing pump as well as the large cooling fan and radiator needed to cool the engine and transmission. Low frequency vibrations and harshness are greatly increased by the large cooling fans and radiator required to cool the diesel engine and transmission. In addition, the diesel engine and transmission are coupled to the hydraulic fracturing pump through a u-joint drive shaft, which requires a three degree offset from the horizontal output of the transmission to the horizontal input of the hydraulic fracturing pump. Diesel powered hydraulic fracturing units are known to jack and jump while operating in the field from the large amounts of vibrations. The vibrations may contribute to fatigue failures of many differed parts of a hydraulic fracturing unit. Recently electrical motors have been introduced to replace the diesel motors, which greatly reduce the noise generated by the equipment during operation. Because of the high pressures generated by the pumps, and that the pumps used for pressurizing the fracturing fluid are reciprocating pumps, a significant amount of vibration is created when pressurizing the fracturing fluid. The vibration transmits to the piping that carries the fracturing fluid and its associated equipment, thereby increasing probabilities of mechanical failure for the piping and equipment, and also shortening their useful operational time.

SUMMARY OF THE INVENTION

Disclosed herein is an example of a hydraulic fracturing system for fracturing a subterranean formation, and which includes an electrically powered fracturing pump having a suction side and a discharge side, a suction branch of piping having fracturing fluid therein, a discharge branch of piping having therein pressurized fracturing fluid supplied from the fracturing pump, a tubular suction lead having an end mounted to the suction side and an opposite end coupled to an end of the suction branch by a grooved connection, and which is pivotal with respect to the suction branch, swivel connections strategically located in the discharge branch of piping, so that when pressurized fracturing fluid flows through the discharge branch of piping, a section of the discharge branch of piping is axially rotatable with an adjacent section of the discharge branch of piping, and helical coils supporting suction and discharge branches of piping at strategically located positions. In one embodiment; engines, transmissions, large cooling fans, and u-joint drive shafts are intentionally not included to minimize both high and low frequency vibrations. At least one of the helical coils can have an axis that is disposed oblique with an axis of an adjacent amount of piping. Optionally included is a pulsation dampener in fluid communication with the suction branch and adjacent the suction lead. In one example the fracturing pump is a first fracturing pump, wherein the suction and discharge branches respectively intersect with suction and discharge piping that are in fluid communication with a second fracturing pump, and wherein the suction and discharge branch intersections are at locations that are each spaced away from a surface on which the first fracturing pump is supported. The surface on which the first fracturing pump is supported can be a trailer, truck, skid, or other platform. In one example, the hydraulic fracturing pump unit has two fracturing pumps where the suction piping for the first pump and the suction piping for the second pump are separate and distinct. This allows for a much simpler fluid dynamic flow that reduces turbulence and vibrations. In another example, the discharge piping for the first pump and the discharge piping for the second pump are separate and distinct from the pump to the edge of the unit. This allows for a simpler fluid dynamic flow that reduces turbulence and vibrations. The hydraulic fracturing system can further include a turbo-generator or other power source and power distribution equipment for generating and distributing electricity used for powering the fracturing pump.

Also disclosed herein is an example of a method of hydraulically fracturing a subterranean formation, and which includes pressurizing fracturing fluid with a hydraulic fracturing system that comprises an electrically powered fracturing pump, a tubular suction branch, and a tubular discharge branch, drawing the fracturing fluid into the fracturing pump through the suction branch, discharging the fracturing fluid from the fracturing pump through the discharge branch, introducing the fracturing fluid to the formation to create a fracture in the formation, and reducing vibration in the hydraulic fracturing system by, strategically locating swivel joints in the suction and discharge branches, so that designated sections of the suction and discharge branches are moveable with respect to other sections of the suction and discharge branches, providing a grooved connection in the suction branch, so that piping supplying fracturing fluid to the fracturing pump is pivotable with respect to the fracturing pump, maintaining portions of the suction and discharge branches that are supported on a surface that supports the fracturing pump from other suction and discharge branches, and resting the suction and discharge branches on helical coils. The method can further include providing an elastomeric yoke with the helical coils. Optionally, some of the fluid in the suction branch can be routed to an accumulator. The method can further include powering the fracturing pump with electricity generated by a turbo-generator or other power supply.

An alternate example of a method of hydraulically fracturing a subterranean formation includes pressurizing fracturing fluid with a hydraulic fracturing system that includes an electrically powered fracturing pump and piping coupled with the fracturing pump, discharging pressurized fracturing fluid for delivery to a wellbore that intersects the formation so that the pressurized fracturing fluid fractures the formation, and reducing vibration in the hydraulic fracturing system by providing joints in the piping at strategic locations so that adjacent sections of the piping pivot and/or swivel. The joints can include a swiveling joint that allows relative rotational movement between adjacent sections of the piping. The joints are made up of a grooved connection joint that allows pivoting between adjacent sections of the piping. The method can further include maintaining the piping separate from piping that is in fluid communication with another fracturing pump. In one example, the traditional engine and transmission are replaced by a variable frequency drive ("VFD") and an electric motor. Then the traditional u-joint drive line, which requires at least a three degree offset from the horizontal output of the transmission with the horizontal input of the hydraulic fracturing pump, is replaced by a direct coupling to reduce or eliminate the vibrations caused by the required misalignment that the traditional u-joint drive shaft requires.

BRIEF DESCRIPTION OF DRAWINGS

Some of the features and benefits of the present invention having been stated, others will become apparent as the description proceeds when taken in conjunction with the accompanying drawings, in which.

Figure 1:
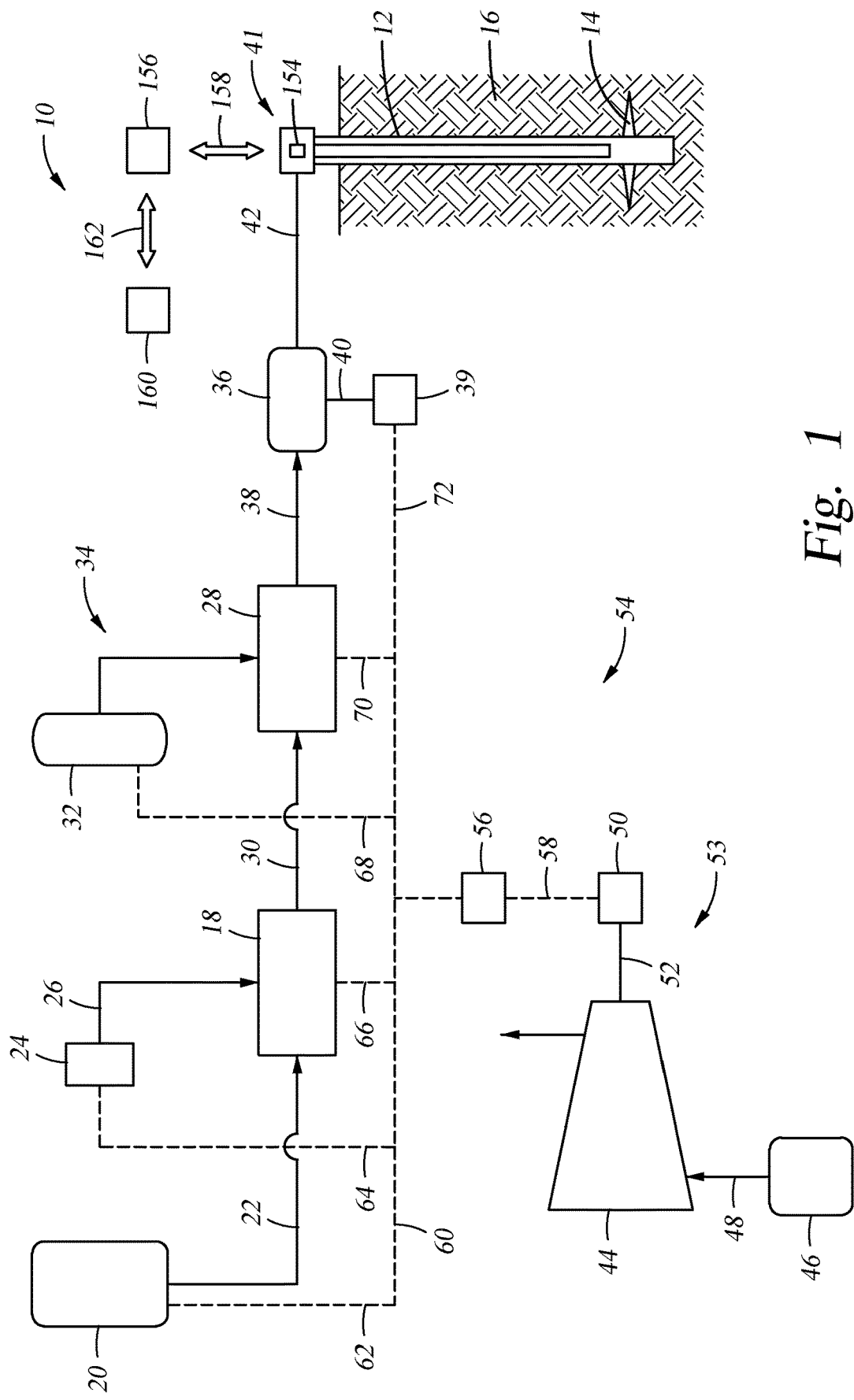
FIG. 1 is a schematic of an example of a hydraulic fracturing system.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 is a schematic example of a hydraulic fracturing system 10 that is used for pressurizing a wellbore 12 to create fractures 14 in a subterranean formation 16 that surrounds the wellbore 12. Included with the system 10 is a hydration unit 18 that receives fluid from a fluid source 20 via line 22, and also selectively receives additives from an additive source 24 via line 26. Additive source 24 can be separate from the hydration unit 18 as a stand-alone unit, or can be included as part of the same unit as the hydration unit 18. The fluid, which in one example is water, is mixed inside of the hydration unit 18 with the additives. In an embodiment, the fluid and additives are mixed over a period of time to allow for uniform distribution of the additives within the fluid. In the example of FIG. 1, the fluid and additive mixture is transferred to a blender 28 via line 30. A proppant source 32 contains proppant, which is delivered to the blender 28 as represented by line 34, where line 34 can be a conveyer. Inside the blender 28, the proppant and fluid/additive mixture are combined to form a fracturing slurry, which is then transferred to a fracturing pump 36 via line 38; thus fluid in line 38 includes the discharge of blender unit 28 which is the suction (or boost) for the fracturing pump system 36. Blender 28 can have an onboard chemical additive system, such as with chemical pumps and augers. Optionally, additive source 24 can provide chemicals to blender 28; or a separate and standalone chemical additive system (not shown) can be provided for delivering chemicals to the blender 28. In an example, the pressure of the slurry in line 38 ranges from around 80 psi to around 100 psi. The pressure of the slurry can be increased up to around 15,000 psi by pump 36. A motor 39, which connects to pump 36 via connection 40, drives pump 36 so that it can pressurize the slurry. In one example, the connection 40 is a direct coupling between an electric motor 39 and a hydraulic fracturing pump 36. In another example, the connection 40 is more than one direct coupling (one on each end of the motor) (not shown) and two hydraulic fracturing pumps. Each of these hydraulic fracturing pumps 36 may be decoupled independently from the main electric motor 39. In one example, the motor 39 is controlled by a variable frequency drive ("VFD"). After being discharged from pump 36, slurry is injected into a wellhead assembly 41; discharge piping 42 connects discharge of pump 36 with wellhead assembly 41 and provides a conduit for the slurry between the pump 36 and the wellhead assembly 41. In an alternative, hoses or other connections can be used to provide a conduit for the slurry between the pump 36 and the wellhead assembly 41. Optionally, any type of fluid can be pressurized by the fracturing pump 36 to form a fracturing fluid that is then pumped into the wellbore 12 for fracturing the formation 14, and is not limited to fluids having chemicals or proppant. Examples also exist wherein the system 10 includes the ability to pump down equipment, instrumentation, or other retrievable items through the slurry into the wellbore.

An example of a turbine 44 is provided in the example of FIG. 1 and which receives a combustible fuel from a fuel source 46 via a feed line 48. In one example, the combustible fuel is natural gas, and the fuel source 46 can be a container of natural gas or a well (not shown) proximate the turbine 44. Combustion of the fuel in the turbine 44 in turn powers a generator 50 that produces electricity. Shaft 52 connects generator 50 to turbine 44. The combination of the turbine 44, generator 50, and shaft 52 define a turbine generator 53. In another example, gearing can also be used to connect the turbine 44 and generator 50. An example of a micro-grid 54 is further illustrated in FIG. 1, and which distributes electricity generated by the turbine generator 53. Included with the micro-grid 54 is a transformer 56 for stepping down voltage of the electricity generated by the generator 50 to a voltage more compatible for use by electrical powered devices in the hydraulic fracturing system 10. In another example, the power generated by the turbine generator and the power utilized by the electrical powered devices in the hydraulic fracturing system 10 are of the same voltage, such as 4160 V so that main power transformers are not needed. In one embodiment, multiple 3500 kVA dry cast coil transformers are utilized. Electricity generated in generator 50 is conveyed to transformer 56 via line 58. In one example, transformer 56 steps the voltage down from 13.8 kV to around 600 V. Other step down voltages can include 4,160 V, 480 V, or other voltages. The output or low voltage side of the transformer 56 connects to a power bus 60, lines 62, 64, 66, 68, 70, and 72 connect to power bus 60 and deliver electricity to electrically powered end users in the system 10. More specifically, line 62 connects fluid source 20 to bus 60, line 64 connects additive source 24 to bus 60, line 66 connects hydration unit 18 to bus 60, line 68 connects proppant source 32 to bus 60, line 70 connects blender 28 to bus 60, and line 72 connects motor 39 to bus 60. In an example, additive source 24 contains ten or more chemical pumps for supplementing the existing chemical pumps on the hydration unit 18 and blender 28. Chemicals from the additive source 24 can be delivered via lines 26 to either the hydration unit 18 and/or the blender 28.

Figure 2:
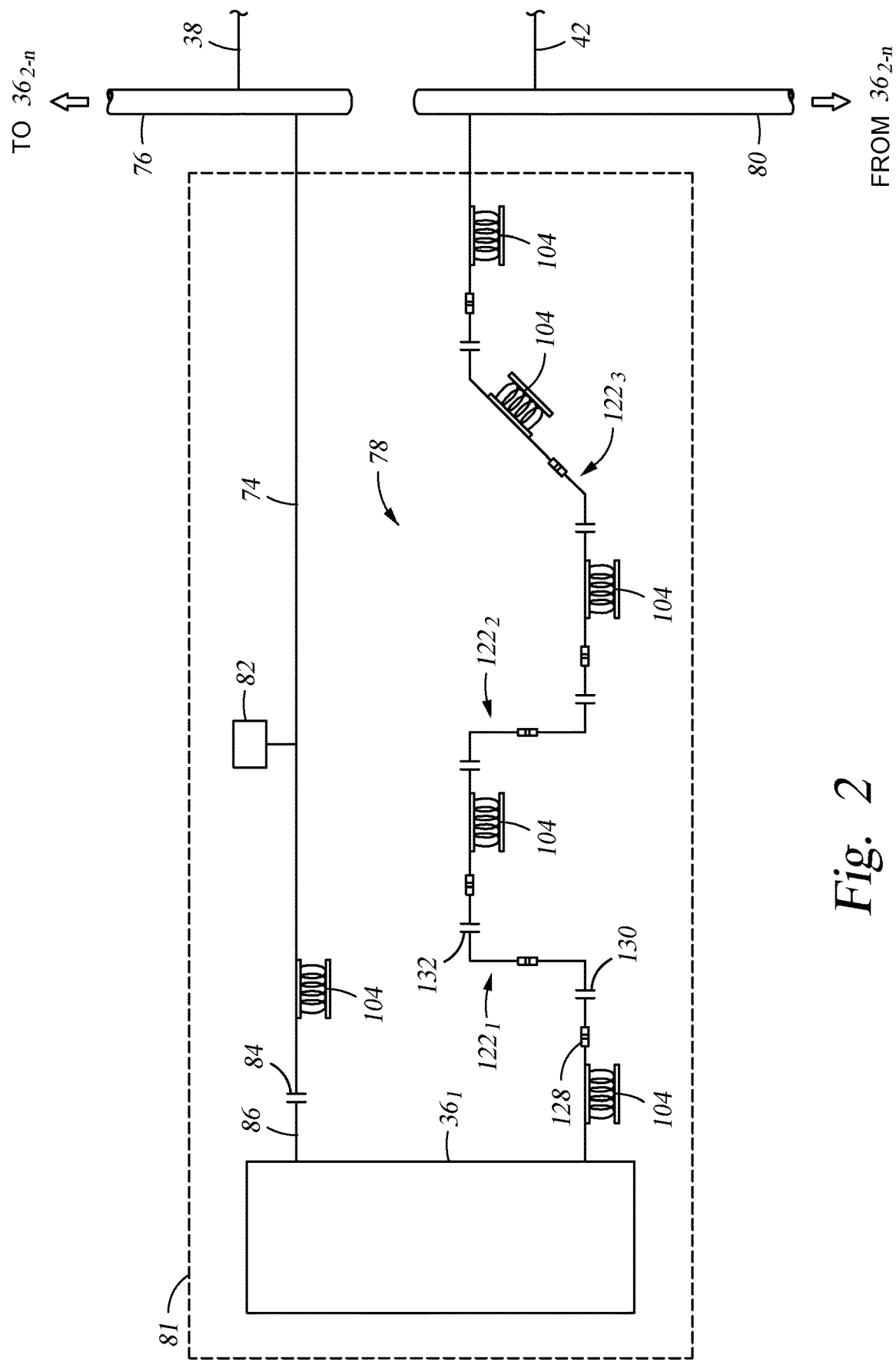
FIG. 2 is schematic of an example of piping of the hydraulic fracturing system of FIG. 1 having vibration reducing equipment.

FIG. 2 shows in a schematic form an embodiment where multiple pumps $36_{1-n}$ are used in the system 10 of FIG. 1 for pressurizing fracturing fluid. In this example, fracturing fluid flows to pump $36_1$ via suction branch 74; where an end of suction branch 74 distal from pump $36_1$ connects to a suction manifold 76. Fracturing fluid is fed to the manifold 76 via line 38, and fracturing fluid can be delivered to the remaining pumps in $36_{2-n}$ via the suction manifold 76. A discharge end of pump $36_1$ connects to a discharge branch 78, which carries fracturing fluid pressurized by pump $36_1$, from pump $36_1$, and for delivery into the wellbore 12 (FIG. 1). An end of discharge branch 78 distal from pump $36_1$ connects to a discharge manifold 80, that provides fluid communication between discharge branch 78 and discharge piping 42 (FIG. 1). Discharge manifold 80 is also shown providing fluid communication to discharge piping 42 from pumps $36_{2-n}$. It should be pointed out that the suction and discharge branches 74, 78 each respectively connect to suction and discharge manifolds 76, 80 outside of a support platform 81 (schematically illustrated by the dashed line). Thus the suction and discharge branches 74, 78 are kept separate from other piping while on the support platform 81. In one example, more than one pump 36 may be installed on the same platform. The suction piping 74 for each pump 36 can be separate while on the unit to minimize vibrations caused by turbulent flow. In another example, more than one pump 36 may be installed on the same platform. The discharge piping 78 in this example is separate for each pump 36 while on the unit to minimize vibrations caused by turbulent flow. Examples of support surfaces 81 include skids, trailers, and any other frame or structure used for mounting the pump $36_1$ and its associated hardware during operation. Keeping the suction and discharge branches 74, 78 separate from one another helps reduce vibration in the system 10. An example of a pulsation dampener 82 is shown connected to suction branch 74, and which can account for pressure or flow surges within suction branch 74 to help reduce vibration within the hydraulic fracturing system 10 (FIG. 1).

Figure 3:
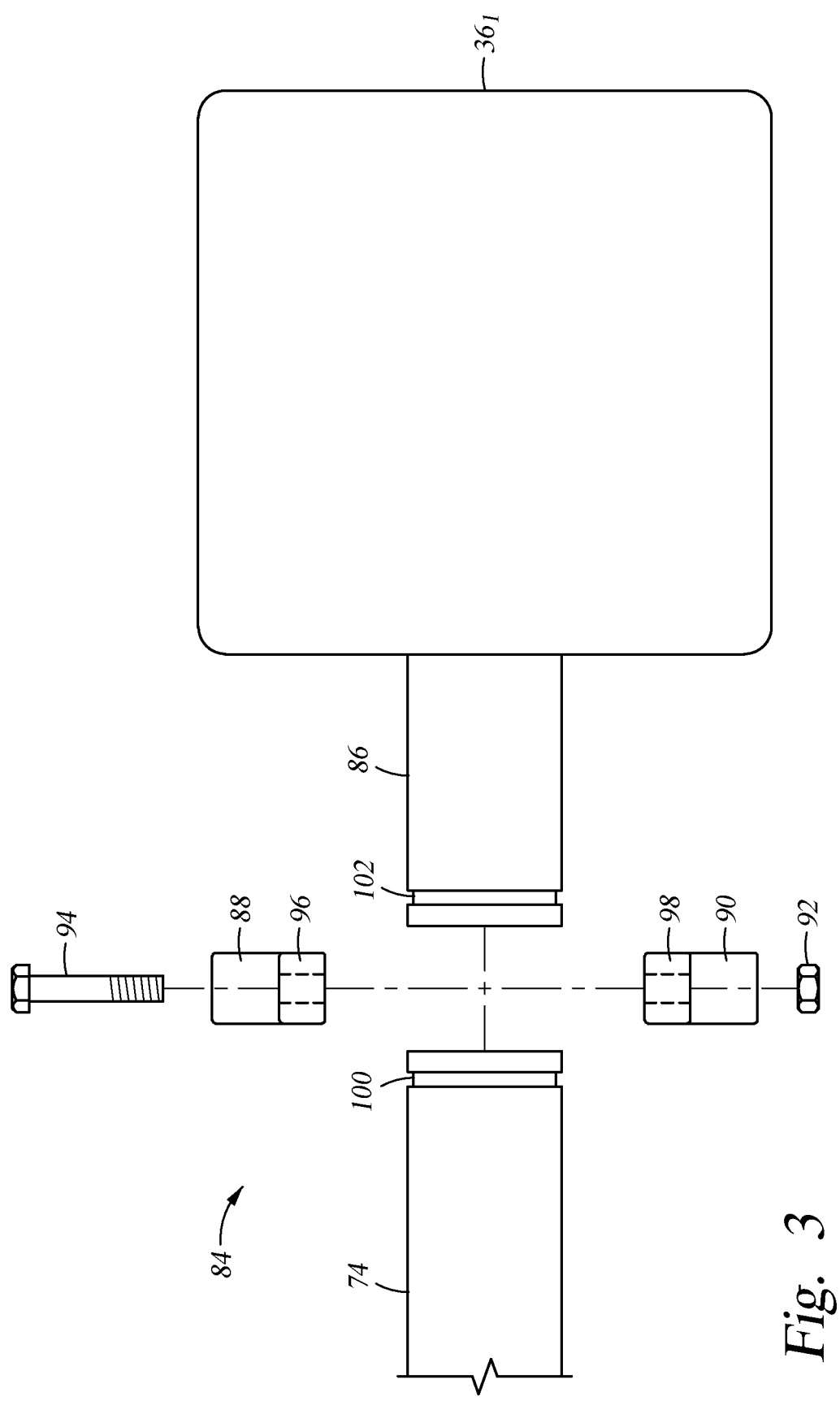
FIG. 3 is a schematic of an example of a pipe coupling for use with the hydraulic fracturing system of FIG. 1.

An additional vibration reducing component includes a groove to connection joint 84, which provides a fluid type connection between the suction branch 74 and suction lead 86 on the suction side of pump $36_1$. In one example, the suction lead 86 includes a suction manifold to help ensure sufficient flow to the hydraulic fracturing pump and eliminate cavitation, which causes violent vibrations. Referring now to FIG. 3, a schematic example of one embodiment of a grooved connection joint 84 is provided in an exploded view. Here, the connection joint 84 includes a pair of semi-circular clamp members 88, 90 that are joined to one another by a nut 92 and bolt 94. Flange portions 96, 98 on respective clamp members 88, 90 include openings through which bolt 94 can be inserted and for attachment with nut 92 to hold together the clamp members 88, 90. Opposing ends of the clamp members 88, 90 may also include flange members that can be attached by a nut bolt arrangement as shown. The inner surfaces of clamp members 88, 90 are complementarily formed to engage grooves 100, 102 shown formed respectively along the outer circumferences of the suction branch 74 and suction lead 86. An advantage of the grooved connection joint 84 is that the suction branch 74 and suction lead 86 are pivotable with respect to one another, while still maintaining a fluid type communication across the connection joint 84. One example of a pivotable motion is where the suction branch 74 and/or suction lead 86 are reoriented so that they are no longer coaxial with one another. Facilitating relative pivoting movement between the suction branch 74 and suction lead 86 across the grooved connection joint 84 provides another way of reducing vibration within the system 10 (FIG. 1). One non-limiting example of a grooved connection joint 84 is referred to as a rigid coupling and may be obtained from Victaulic, 1833 North Promenade Boulevard, Stafford, Tex. 77477, 1-800-PICK-VIC.

Figure 4:
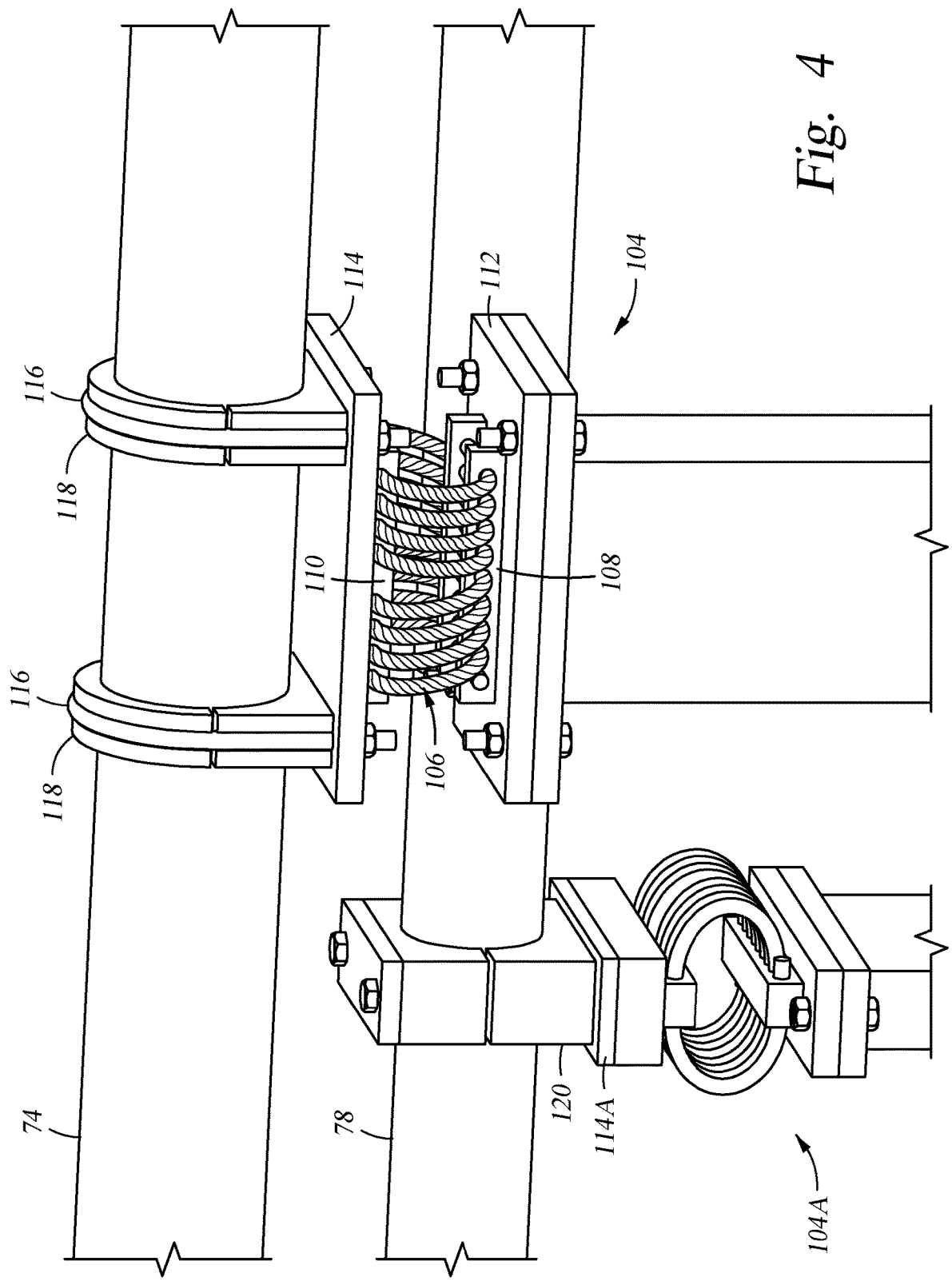
FIG. 4 is a side perspective view of an example of a cable coil assembly for use with the hydraulic fracturing system of FIG. 1.

Referring back to FIG. 2, additional means for reducing vibration in the system 10 (FIG. 1) includes strategically locating cable coil assemblies 104 along the suction and discharge branches 74, 78. As its name implies, the cable coil assembly 104 is made up of strands of elastic material wound into a generally helical configuration. One example of a cable coil assembly 104 shown in a side perspective view in FIG. 4 and which includes a coil 106, shown formed from a wire rope coiled into a helix, and lower and upper mounting bars 108, 104 anchoring each half turn of the coil 106. The bars 108, 110 are elongate members with rectangular cross sections that respectively couple with lower and upper plates 112, 114. The elements of the coil assembly 104 of FIG. 4 provide an example of a cohesive mounting arrangement for supporting the associated suction branch 74. In this example, a U-bolt 116 is shown affixing the upper plate 114 to suction branch 74; and a semi-circular grommet 118 is provided between the U-bolt 116 and the suction branch 74. An alternate embodiment of the cable coil assembly 104A is also illustrated in FIG. 4 and which is coupled with discharge branch 78. Cable coil assembly 104A includes a yoke 120 mounted to upper plate 114A. In one example, yoke 120 is formed from an elastomeric material.

Figure 5:
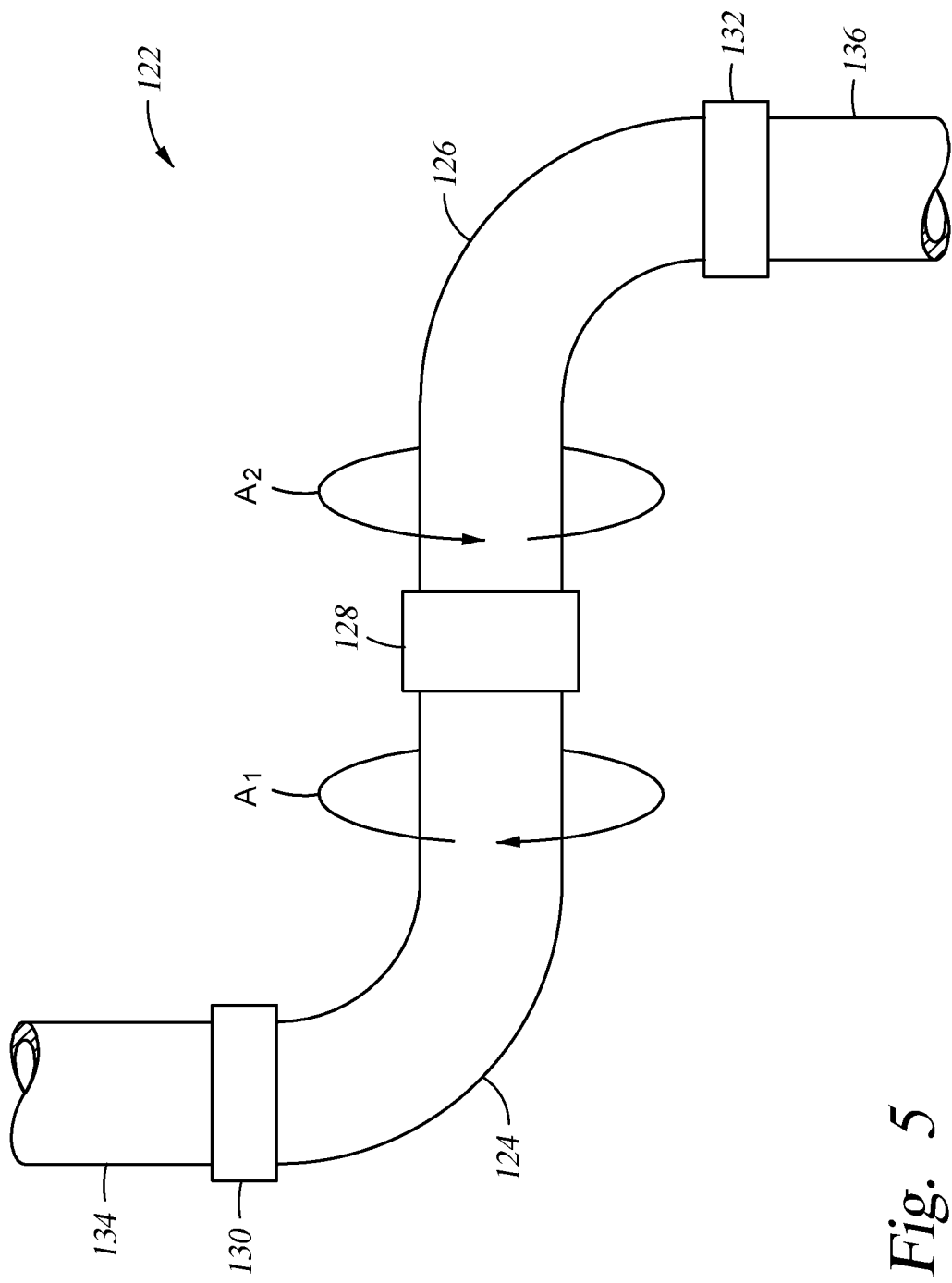
FIG. 5 is a side view of an example of a swivel assembly for use with piping in the hydraulic fracturing system of FIG. 1.

Referring back to FIG. 2, swivel assemblies $122_{1-3}$ are shown included at strategic locations within the discharge branch 78. The swivel assemblies $122_{1-3}$ allow adjacent sections of the piping to swivel, i.e. rotate with respect to one another. By strategically locating swivel assemblies $122_{1-3}$ in portions of a piping run that includes turns or elbows, entire segments of the piping run can be moveable with respect to other pipe segments. Moreover, as the adjacent sections of piping are coupled by a swivel assembly, the relative motion can take place without introducing stress or strain into the pipe itself. Thus implementation of the swivel assemblies can absorb vibrational motion through stress free flexing thereby further reducing and attenuating vibration in the system 10. It should be pointed out that the number of swivel assemblies $122_{1-3}$ shown is merely illustrative, and that any number of swivel assemblies can be included. FIG. 5 shows one example of a swivel assembly 122 and which includes sections of pipe 124, 126 that are joined to one another by a swivel joint 128. Swivel joint 128 sealingly couples together the sections of pipe 124, 126 and yet allows relative rotation of the pipes 124, 126 as illustrated by arrows $A_1$, $A_2$. In one embodiment, strategically locating assemblies 122 within the discharge branch 78 (FIG. 2) for entire sections of discharge branch 78 to move along an arc with respect to other sections of the discharge branch 78. Further included in this example of the swivel assembly of FIG. 5 are fittings 130, 132 shown on the ends of pipes 124, 126 that are distal from the swivel joint 128. The fittings 130, 132 allow for connection to lines 134, 136 where lines make up piping within the discharge branch 78 of FIG. 2. In one embodiment, fittings 130, 132 are hammer unions, which are female threaded wings with three large lugs on the outside which are struck with sledge hammers to ensure that they are tight. An example of a hammer wing is visible in FIG. 6 where pipe 122A connects with pump 36. An example swivel assembly 122 for use herein may be acquired from FMC Technologies, 187 North Sam Houston Parkway West, Houston, Tex. 77086, 281.591.4000.

Figure 6:
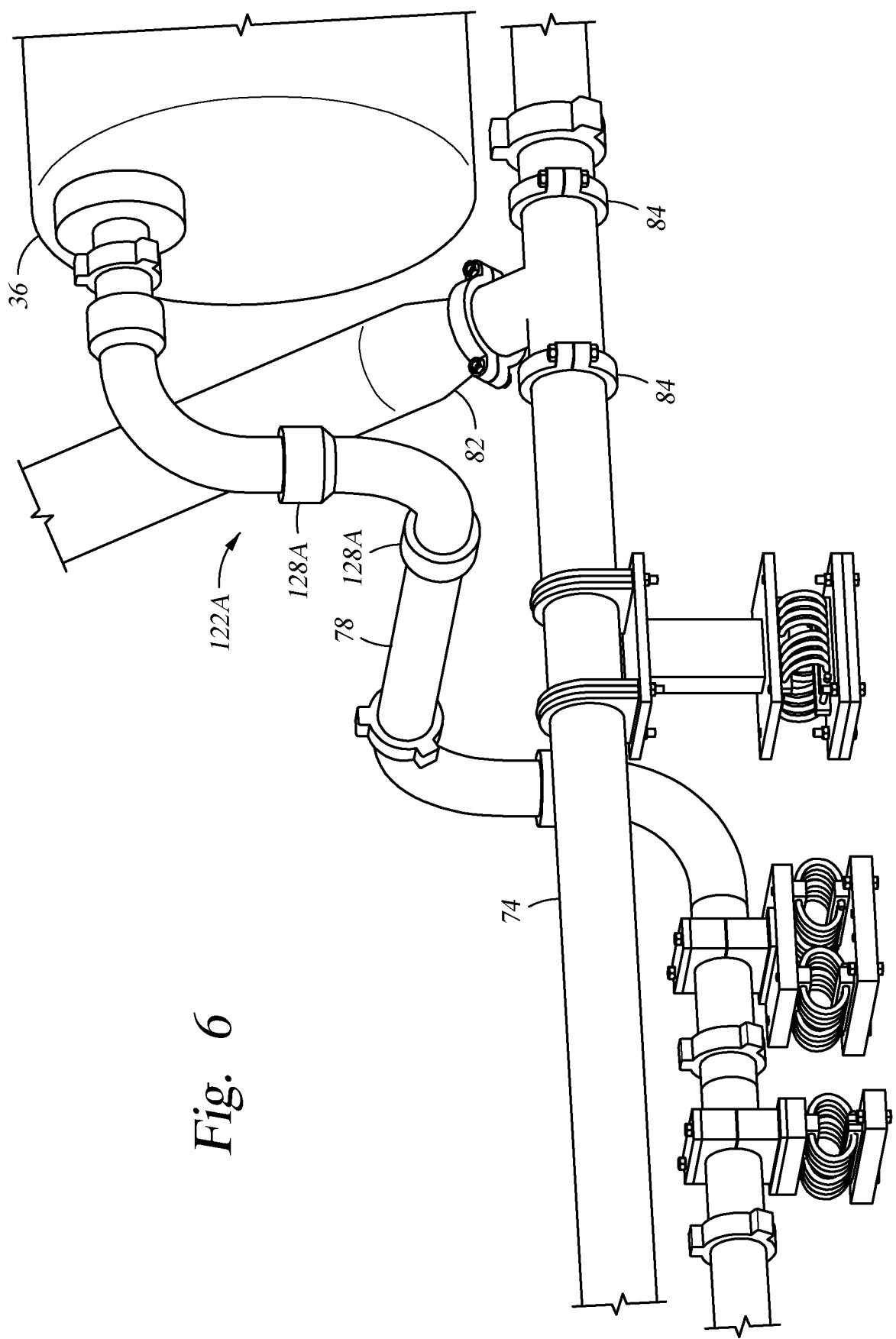
FIG. 6 is a side perspective view of an example of pump suction and discharge piping having vibration reducing equipment.

FIG. 6 shows in a perspective view examples of portions of a suction branch 74 and discharge branch 78 coupled with a pump 36. Included in the example of the discharge branch 78 is an alternate example of a swivel assembly 122A which includes sections of piping, and more than one swivel joint 128A, accordingly, multiple examples of the swivel joint 122 can be incorporated in the disclosure herein. Further illustrated is an example of the pulsation dampener 82 and which couples with the suction branch 74 via grooved connection joints 84. Moreover, the downstream end of the "T" fitting connects to the actual intake of pump 36 with the grooved connection joint 84.

Figure 7:
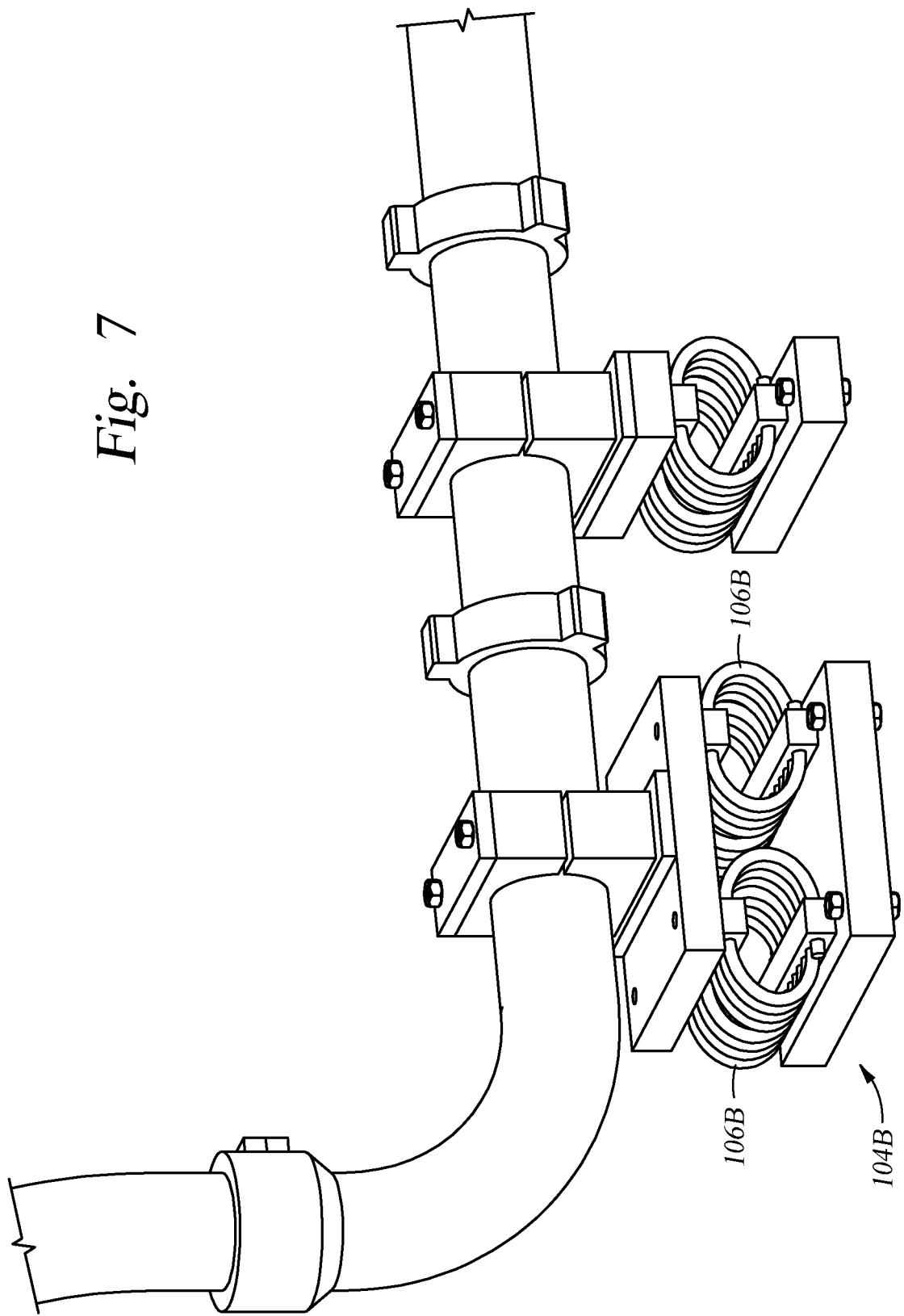
FIG. 7 is a side perspective view of an alternate example of a cable coil assembly.

FIG. 7 shows a side perspective view and an alternate example of the cable coil assembly in 104B, wherein multiple coils 106B are included with the coil assembly 104B. Further, it should be pointed out that examples of the cable coil assembly 104 exists wherein an axis of the helix of the coil 106 is oriented at angles that vary from an axis of the associated piping supported by the cable coil assembly 104. Changing the direction of the axis of the helix of the coil 106 can provide for different frame constant values thereby effecting continuation of vibration in different manners.

Figure 8A:
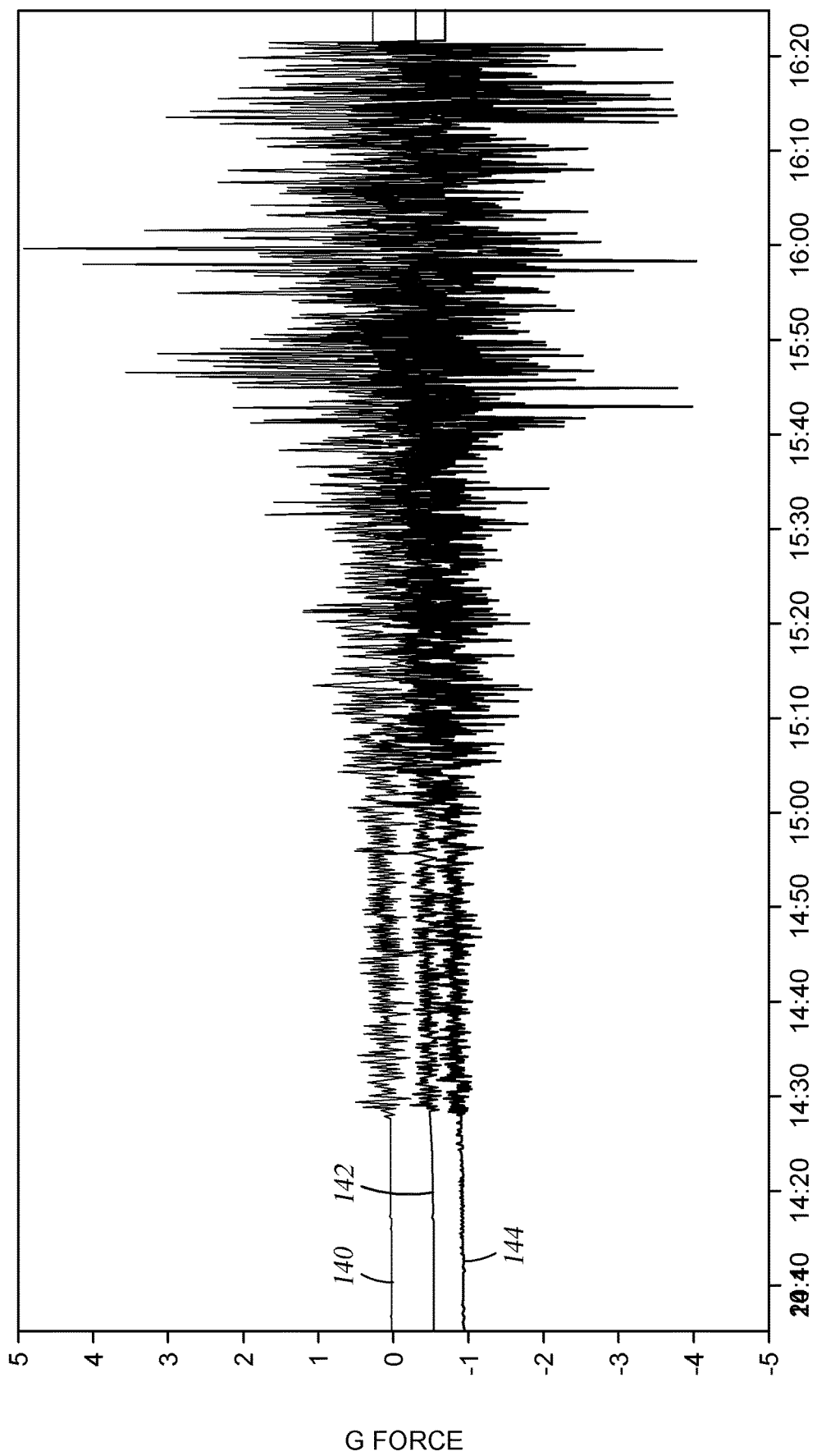
FIGS. 8A and 8B are graphs having plots representing measured values of vibration of hydraulic fracturing units without and with vibration reducing equipment, respectively.
Figure 8B:
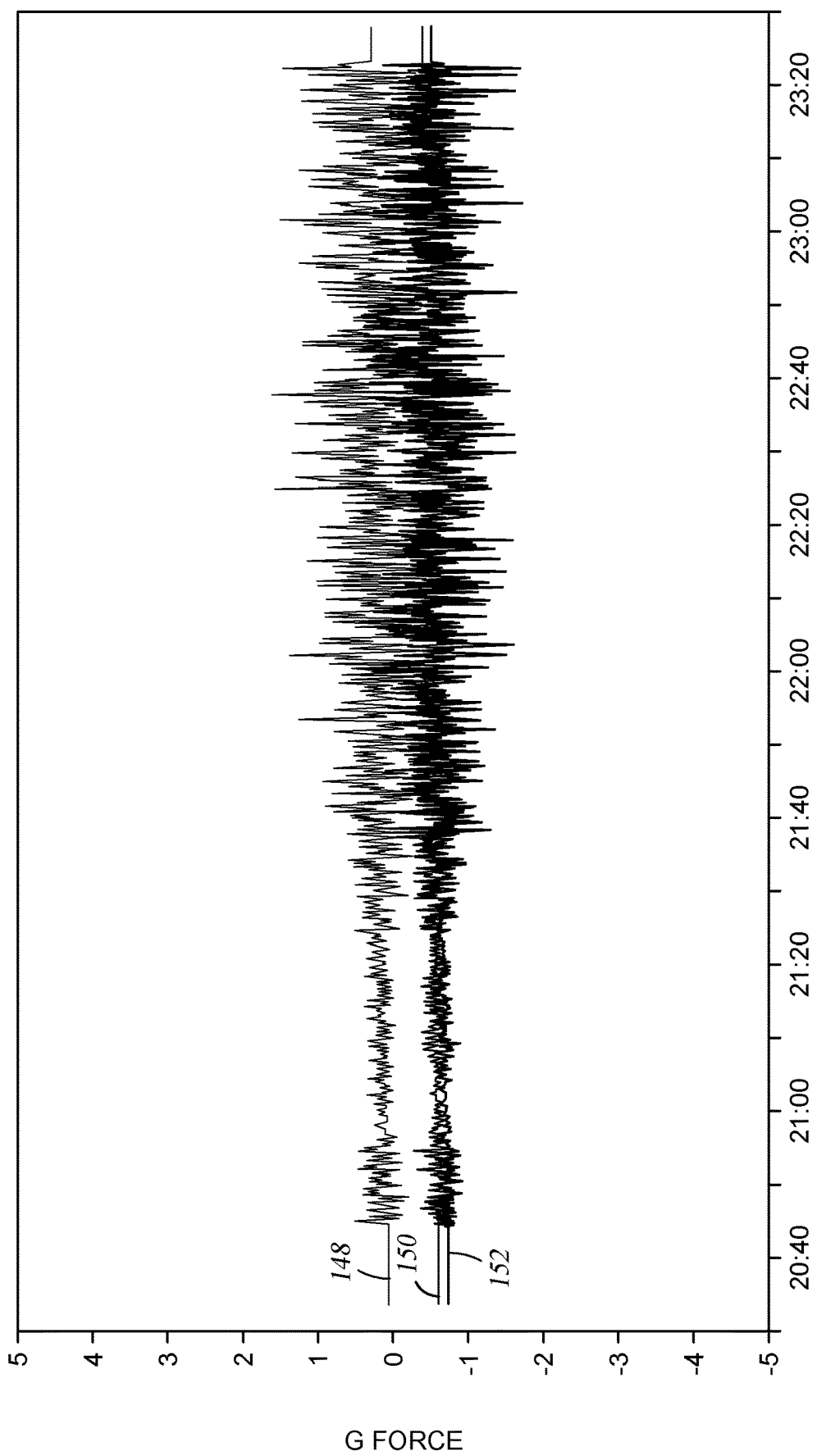

FIGS. 8A and 8B include graphs whose ordinate represent gravitational forces and abscissa represents values of time. In one example, shown in FIG. 8A, gravitational forces were measured in three coordinate axes from a hydraulic fracturing system during its operation. Plots 140, 142, 144 represent gravitational forces measure along those axes over time. Similarly, as shown in FIG. 8B, graph includes plots 148, 150, 152, which represent measured gravitational forces along those same axes over time, and were obtained from a hydraulic fracturing system having the vibrational reducing elements described herein. As can be seen from comparing the graphs of FIGS. 8A and 8B, the gravitational forces were significantly and unexpectedly reduced by implementation by the vibration reducing forces. Sensors 154 (FIG. 1) are shown mounted to the wellhead, and which can be used to measure the gravitational forces. In another example, multiple sensors 154 may be mounted to multiple parts of the hydraulic fracturing fleet. In one example one or more sensors are mounted on each hydraulic fracturing fluid end as well as the power end. In another example a sensor is mounted near the blender discharge pump. Optionally, information sensed by sensors 154 is transmitted to an information handling system ("IHS") 156. The IHS 156 may also be used to store recorded data as well as processing the data into a readable format. The IHS 156 may include a processor, memory accessible by the processor, nonvolatile storage area accessible by the processor, and logic algorithms for performing each of the steps above described. Information is transmitted to IHS 156 from sensor 154 via communication means 158, which can be hardwired, wireless, pneumatic, or any other way of transmitting information. Further, IHS 156 communicates to a controller 160 via communication means 162, which can be similar to communication means 158. In an example of operation, controller 160 can be used for sending control commands for operation of the system 10, and thus can utilize vibration information from sensors 154 to adjust control commands. In one example, the IHS 156 communicates with the World Wide Web to allow for remote reviewing of the information. In one example, the IHS 156 system also receives information from a VFD. In another example, the IHS 156 system receives information such as fluid rate, boost pressure, discharge pressure, and other information to coordinate with the vibration data.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A hydraulic fracturing system for fracturing a subterranean formation comprising:
    an electrically powered fracturing pump having a discharge side;
    a discharge branch of piping having therein pressurized fracturing fluid supplied from the fracturing pump; and
    swivel connections strategically located in the discharge branch of piping, so that when pressurized fracturing fluid flows through the discharge branch of piping, a section of the discharge branch of piping is axially rotatable with an adjacent section of the discharge branch of piping.

2. The hydraulic fracturing system of claim 1, further comprising at least one helical coil supporting discharge branches of piping at a strategically located position.

3. The hydraulic fracturing system of claim 1, wherein at least one of the helical coils has an axis that is disposed oblique with an axis of an adjacent amount of piping.

4. The hydraulic fracturing system of claim 1, wherein the fracturing pump is a first fracturing pump, wherein the discharge branches intersect with discharge piping that are in fluid communication with a second fracturing pump, and wherein the discharge branch intersections are at locations that are each spaced away from a surface on which the first fracturing pump is supported.

5. The hydraulic fracturing system of claim 4, wherein the surface on which the first fracturing pump is supported comprises a trailer, truck, or skid.

6. The hydraulic fracturing system of claim 1, further comprising a generator for generating electricity used for powering the fracturing pump.

7. The hydraulic fracturing system of claim 1, further comprising a controller that uses vibration data to monitor and/or adjust control commands of the system.

8. A hydraulic fracturing system for fracturing a subterranean formation comprising:
    an electrically powered fracturing pump having a suction side;
    a suction branch of piping having fracturing fluid therein; and
    a tubular suction lead having an end mounted to the suction side and an opposite end coupled to an end of the suction branch by a grooved connection, and which is pivotal with respect to the suction branch; and
    a discharge branch of piping having therein the pressurized fracturing fluid supplied from the fracturing pump; and
    swivel connections strategically located in the discharge branch of piping, so that when the pressurized fracturing fluid flows through the discharge branch of piping, a section of the discharge branch of piping is axially rotatable with an adjacent section of the discharge branch of piping.

9. The hydraulic fracturing system of claim 8, further comprising helical coils supporting suction branches of piping at strategically located positions.

10. The hydraulic fracturing system of claim 8, wherein at least one of the helical coils has an axis that is disposed oblique with an axis of an adjacent amount of piping.

11. The hydraulic fracturing system of claim 8, further comprising a pulsation dampener in fluid communication with the suction branch and adjacent the section lead.

12. The hydraulic fracturing system of claim 8, wherein the fracturing pump is a first fracturing pump, wherein the suction branches intersect with suction piping that are in fluid communication with a second fracturing pump, and wherein the suction branch intersections are at locations that are each spaced away from a surface on which the first fracturing pump is supported.

13. The hydraulic fracturing system of claim 12, wherein the surface on which the first fracturing pump is supported comprises a trailer, truck, or skid.

14. The hydraulic fracturing system of claim 8, further comprising a generator for generating electricity used for powering the fracturing pump.

15. The hydraulic fracturing system of claim 8, further comprising a controller that uses vibration data to monitor and/or adjust control commands of the system.

\* \* \* \* \*

(12) INTER PARTES REVIEW CERTIFICATE (4166th)

United States Patent
Oehring et al.

(10) Number: US 10,934,824 K1
(45) Certificate Issued: Oct. 27, 2025

(54) SYSTEM FOR REDUCING VIBRATIONS IN A PRESSURE PUMPING FLEET

(71) Applicants: Jared Oehring; Robert Kurtz

(72) Inventors: Jared Oehring; Robert Kurtz

Trial Number:
IPR2022-00610 filed Mar. 1, 2022

Inter Partes Review Certificate for:
Patent No.: 10,934,824
Issued: Mar. 2, 2021
Appl. No.: 16/158,756
Filed: Oct. 12, 2018

The results of IPR2022-00610 are reflected in this inter partes review certificate under 35 U.S.C. 318(b).

INTER PARTES REVIEW CERTIFICATE
U.S. Patent 10,934,824 K1
Trial No. IPR2022-00610
Certificate Issued Oct. 27, 2025

AS A RESULT OF THE INTER PARTES REVIEW PROCEEDING, IT HAS BEEN DETERMINED THAT:

Claims 1-15 are cancelled.

\* \* \* \* \*